Patented Mar. 21, 1933

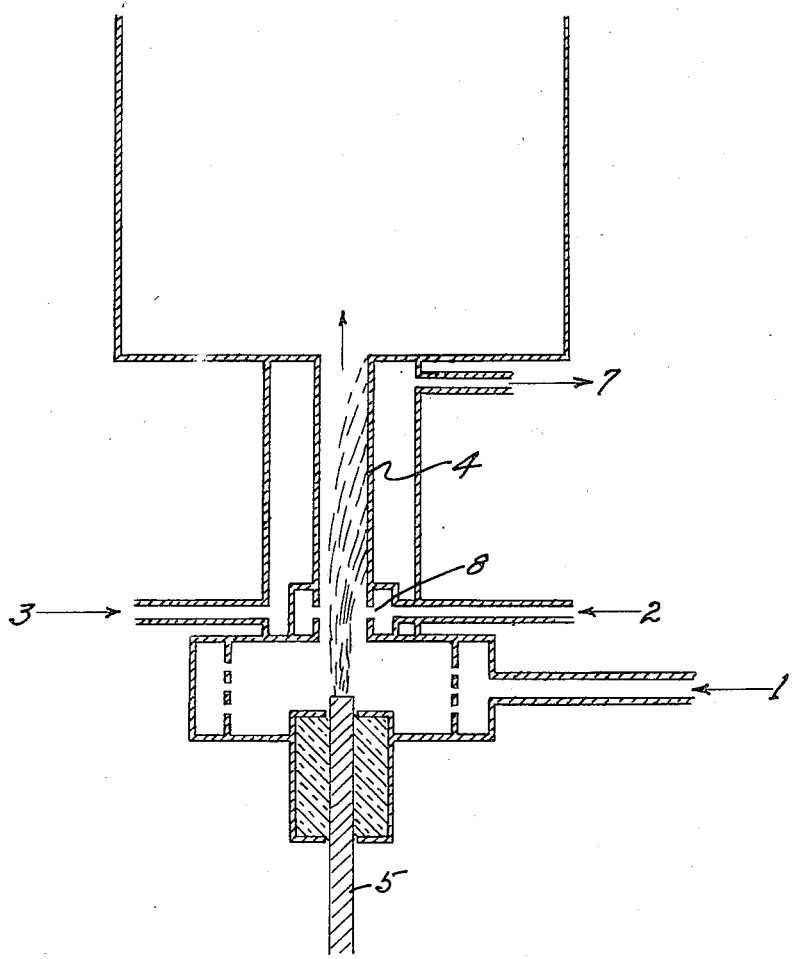

1,902,351

UNITED STATES PATENT OFFICE

PAUL BAUMANN, HEINRICH SCHILLING AND ALBERT FISCHER, OF LUDWIGSHAFEN-ON-THE-RHINE, GERMANY, ASSIGNORS TO I. G. FARBENINDUSTRIE AKTIENGESELL-SCHAFT, OF FRANKFORT-ON-THE-MAIN, GERMANY

TREATING CARBONACEOUS MATERIALS WITH ELECTRIC ARCS

Application filed March 16, 1932, Serial No. 599,156, and in Germany March 20, 1931.

The present invention relates to improvements in the removal or avoidance of deposits during chemical conversions, especially of carbonaceous substances.

In the conversion of gaseous or vaporous carbonaceous materials in the electric arc, for example for the production of hydrocyanic acid of unsaturated hydrocarbons, such as acetylene, from gaseous or vaporous carbonaceous substances, such as any kind of hydrocarbon gases as for example methane, natural gas, waste gases from the destructive hydrogenation of carbonaceous materials or from cracking hydrocarbon oils, or oil vapors; or from oils in the form of mist or solid carbonaceous matter in the form of dust suspended in a gas, which materials are hereinafter referred to as "vaporized carbonaceous materials"; undesirable deposits of solid or semisolid substances, such as carbon or ashes or sticky tar-like masses frequently take place which easily give rise to injurious phenomena such as side reactions and stoppage of the arc furnace. The said deposits settle partly on the walls of the arc furnace and partly in the devices attached thereto and serving for cooling the reaction products, whereby a rapid transfer of heat through the walls is prevented so that the reaction mixture is kept at a high temperature for too long a period of time thus giving rise to the formation of undesirable bye-products. Moreover, the presence of carbon black has an accelerating effect on the formation of the undesirable bye-products. Naturally, the said objections are more noticeable when carbonaceous gases are intentionally worked up into carbon black or when carbon or the like is already contained in the initial gases.

We have now found that the injurious deposition of the said substances is readily prevented or removed in a simple and very efficient manner by continuously or periodically suspending in the vaporized carbonaceous materials to be treated or with a part thereof, finely divided solid substances which are not chemically altered by the arc and do not take part in the reaction, as for example sand or ashes. This has the effect of always keeping the walls of the furnace free from carbon black or other solid deposits or of completely removing the same within a short period of time in cases when carbon black or the like has already been deposited. The said solid substances are introduced so that they come into contact with the walls, thus cleaning the latter from matter deposited thereon. The additional materials and the deposits carried away from the walls may be readily separated from the gases again in special chambers in the manner already known. This separation may be effected especially readily by spraying liquids into the gas; the liquids together with the solid constituents are then removed again in the usual liquid separators.

The amount of solid additional substances necessary for the purification is usually very small. Thus for example in the preparation of acetylene from methane in the electric arc, an addition of 0.3 liter of sand during one minute in each hour is sufficient to keep the interior of a 500 kilowatt electric arc furnace entirely clean. The electric arc, which is usually very sensitive to external influences, does not break during the addition of the sand. In this manner it is possible to secure an uninterrupted operation of the electric arc during several days, while without the addition of sand under otherwise similar conditions the furnace must be stopped and opened about every 4 to 6 hours in order to remove the carbon and other deposits from it. It is preferable to employ solid substances the particles of which have a diameter between about one half and two centimeters.

The present invention, in addition to the great advantage that the purification may be carried out during the actual operation without it being necessary to take the furnace or the single parts thereof to pieces, has the further great advantage that the gaseous or liquid reaction products are obtained in practically constant and good yields and that in particular if the gases used for blowing in the solid particles are of the same composition as the gases to be converted in the electric arc, the gaseous or liquid reaction products are not diluted by the addition of solid substances.

The supply of the solid particles may be effected in different ways. They may be continuously or periodically mixed with the gas to be treated or with a part thereof before entry into the furnace. The sand or other solid materials employed may also be mixed with an inert gas which does not take part in the reaction. Furthermore, a substance having a physical, (as for example by dissolution) or chemical action on the deposits to be removed, such as oxygen or steam, may also be used as the carrier gas or vapor. It may also be advantageous to increase the speed of the gas for a short time during the addition of the solid substances in order to increase the abrasive action of the solid particles without in any way affecting the special advantages of the invention, such as continuous operation, cleaning without opening the apparatus, practically constant yields per unit of time and space.

In some cases it is preferable to arrange openings in the furnace in the neighbourhood of places which are especially endangered, through which openings a little gas mixed with solid particles may be supplied continuously or periodically. It is also possible to introduce the solid particles as such into the reaction chamber, as for example by means of a worm conveyor. In many cases it is preferable to use the solid particles as heat transferrers and to heat them before their introduction. In this manner, when adding the solid substances continually, not only is a cooling of the gases avoided but in some cases they may even be heated.

The invention will be further explained with reference to the accompanying drawing showing diagrammatically a vertical section through an arc furnace in which the process according to the present invention may be carried out. The invention is, however, not restricted to the particular arrangement shown in this drawing.

Referring to this drawing 1 denotes the entrance through which the initial carbonaceous gas to be treated may be supplied. The electric arc burns between the electrodes 5 and 4 of which the latter is cooled with water introduced at 3 and flowing off at 7. Additional gas carrying sand is introduced at 2 and enters the arc furnace through slot 8. No injurious deposition of carbon or ashes on the electrode 4 occurs even when working for long periods of time.

What we claim is:—

1. In the treatment of a vaporized carbonaceous material in the electric arc the steps of suspending in said material a finely divided solid substance which is not chemically altered by said arc and then passing the resulting suspension through the arc so that the said solid substance comes into contact with the surfaces confining the arc space.

2. In the production of acetylene by treatment of a vaporized hydrocarbon in the electric arc the steps of suspending in said hydrocarbon a finely divided solid substance which is not chemically altered by said arc and then passing the resulting suspension through the arc so that the said solid substance comes into contact with the surfaces confining the arc space.

3. In the production of acetylene by treatment of a vaporized hydrocarbon in the electric arc the steps of suspending in said hydrocarbon finely divided sand and then passing the resulting suspension through the arc so that the said sand comes into contact with the surfaces confining the arc spaces.

In testimony whereof we hereunto set our hands.

PAUL BAUMANN.
HEINRICH SCHILLING.
ALBERT FISCHER.